(No Model.)
J. F. HOUGHTON.
TEA AND COFFEE POT.
No. 309,783. Patented Dec. 23, 1884.
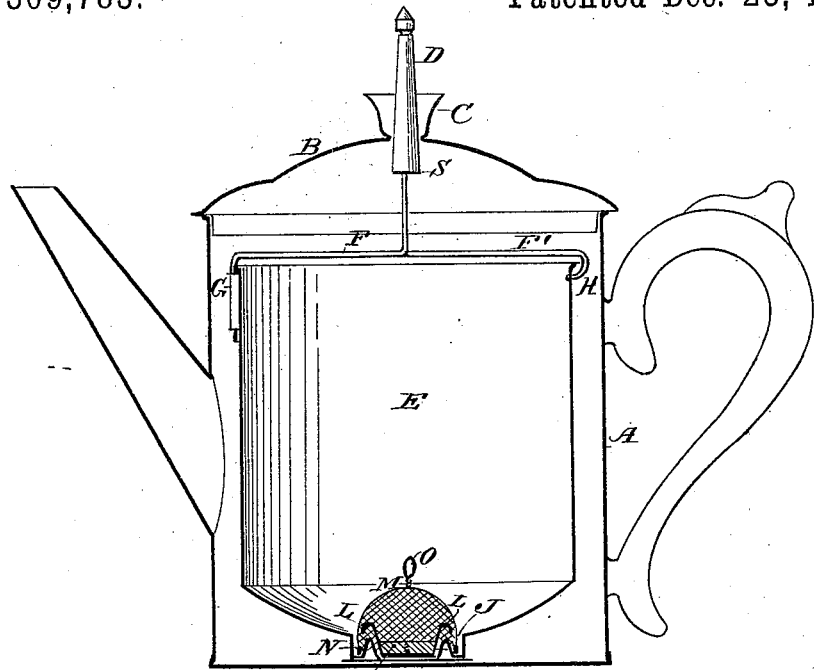
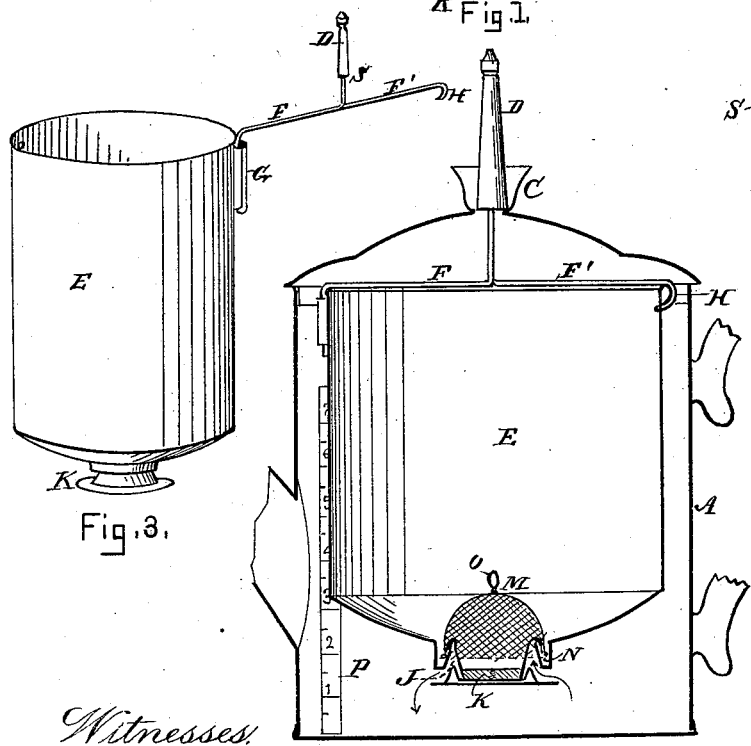
Witnesses:
L. W. Jones
E. A. Phelps
Inventor:
Jesse F. Houghton,
by A. N. Jewett,
his attorney
N. PETERS. Photo-Lithographer, Washington, D. C.

UNITED STATES PATENT OFFICE.

JESSE F. HOUGHTON, OF BOSTON, MASSACHUSETTS.

TEA AND COFFEE POT.

SPECIFICATION forming part of Letters Patent No. 309,783, dated December 23, 1884.

Application filed March 9, 1883. (No model.)

*To all whom it may concern:*

Be it known that I, JESSE F. HOUGHTON, a citizen of the United States, residing at Boston, in the county of Suffolk and State of Massachusetts, have invented certain new and useful Improvements in Tea and Coffee Pots; and I do hereby declare that the same are fully described in the following specification and illustrated in the accompanying drawings.

The object of this invention is to furnish an improved tea or coffee pot having an inner chamber formed with a central aperture at the bottom provided with a valve to close and open it and a strainer to permit passage of the beverage while retaining the grounds. This inner chamber has also a vertical handle extending through the cover of the pot, by which the chamber may be suspended, raised, or lowered without removing the cover, and by a swivel or hinge connection this handle may be swung to one side to give access to the interior of the chamber.

My invention consists in the devices and combinations of devices recited in the appended claims.

In the drawings, Figure 1 is a vertical central section showing the position of the parts with the valve closed. Fig. 2 is a similar view with the inner chamber suspended and the valve open, while Fig. 3 shows the chamber in perspective. Fig. 4 is a modification.

A is the outer vessel—a plain coffee-pot of ordinary construction. B is the cover, having a hollow knob, C, through which projects the vertical handle D of the chamber E, placed within the pot. The handle has, as best shown in Fig. 3, a horizontal part, F F', extending each way from the center to the opposite sides of the top of the chamber. At one side a swivel or hinge connection, G, is formed, and opposite to this the end of the handle forms a hook, H, engaging with a recess or depression in the side of the chamber to hold the parts in position temporarily. The drawings show a suitable form of this handle, which is primarily of stout wire bent to proper shape for the lower portion, while the vertical part is enlarged by casting soft metal thereon, so as to form a handle of convenient dimensions, and one which will practically fill the aperture in the cover. The abrupt termination of this soft-metal enlargement forms a shoulder, S, adapted to engage with the cover when lifted to the proper height, whereby the chamber is suspended free from contact with the bottom of the pot. (See Fig. 2.) That part of the cover which thus engages with the shoulder S is within and at the base of the hollow knob C. When the ordinary hinged cover is employed, I suspend the chamber from the side of the pot opposite the hinge by a vertical handle fixed to the side of the chamber, and long enough to project through a recess in the edge of the cover, so that it may engage with the rim of the pot at that point. (See Fig. 4.) The bottom of the inner chamber, E, has a central aperture, J, provided with a weighted valve, K, opening downward, and made automatic in its action, so that it is closed when the chamber rests in the bottom of the pot A, as in Fig. 1, and opens by gravitation when said chamber is lifted therefrom or held suspended, as in Fig. 2. Any suitable provision for these changes may be made, the means shown in the drawings being sufficient. The valve-seat is tapering to conform to the shape of the valve, and the two wings L, extending within the aperture, engage with its edges when the chamber is lifted, and thus limit the downward movement of the valve.

The strainer M is preferably an inverted gauze hemisphere fitting into an annular recess, N, surrounding the aperture. The strainer is made removable for ready cleansing, and also that it may be conveniently replaced if worn out or injured. To facilitate such removal an upwardly-projecting handle, O, is provided.

A gage, P, formed by preference as a flat strip of metal secured to the inside of the pot, serves as a guide to determine the number of cups of water to provide. In practice the pot will contain such amount of boiling water as is required for the occasion, the amount being readily and accurately determined by the gage.

The chamber containing the tea-leaves or ground coffee, as the case may be, is placed in the pot, and sinks readily to the bottom by reason of the aperture. When the bottom is reached, the valve closes, admitting no more water, and the tea or coffee is allowed to steep a few minutes. Then by raising the chamber by its protruding handle and suspending it, as shown, a free admixture of the liquids in the pot takes place, and it is found that the valuable and nutritious elements desired will be extracted without boiling, the grounds being at the same time kept in the inner vessel, which is suspended within the pot, or may be removed when the beverage is ready for the table.

It is obvious that the hot water may be poured into the chamber direct while in the pot, and also that, if desired, it may be boiled while the parts are in such position.

I am aware of the patent to Miller, dated February 14, 1871, for a coffee-pot having an inner chamber with a bottom valve not automatic, but requiring the valve-rod to be worked by the operator after opening the lid. The inner chamber does not at any time rest on the bottom of the pot, but is suspended by its rim from the upper edge of the pot, requiring an extra amount of the liquid to work it. With my improvement the chamber rests upon the bottom of the pot, thus closing the valve automatically, and when the chamber is raised without requiring to open the lid it may be suspended by its handle, the valve opening automatically by gravity.

I claim as my invention—

1. A coffee or tea pot provided with a removable inner chamber having at the bottom an opening furnished with an automatic valve opened by gravity when the chamber is suspended within the pot and closed when the chamber rests upon the bottom of the pot, in combination with a strainer covering said valve to exclude grounds therefrom, substantially as set forth.

2. The chamber E, having a central aperture in its bottom furnished with a valve and covered by a strainer, and having also a vertical handle extending through the cover, by which the chamber may be suspended, for the purpose set forth.

3. The chamber E, with valve and strainer, and provided with the handle D F, having a hinge and catch, in combination with the pot having a hollow knob, for the purpose set forth.

4. The chamber E, formed with the aperture J, valve K, supporting-wings L, engaging with the edges of the aperture, and removable convex strainer M, for the purpose set forth.

In testimony whereof I hereto affix my signature in presence of two witnesses.

JESSE F. HOUGHTON.

Witnesses:
A. H. SPENCER,
E. A. PHELPS.